(12) United States Patent
Okada et al.

(10) Patent No.: US 7,261,758 B2
(45) Date of Patent: Aug. 28, 2007

(54) NI-BASED SINTERED ALLOY

(75) Inventors: Ikuo Okada, Takasago (JP); Kei Ohsawa, Takasago (JP); Hidetaka Oguma, Takasago (JP); Koji Takahashi, Takasago (JP); Masahiko Onda, Takasago (JP); Takeshi Seto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 462 days.

(21) Appl. No.: 11/012,222

(22) Filed: Dec. 16, 2004

(65) Prior Publication Data

US 2005/0097986 A1 May 12, 2005

Related U.S. Application Data

(60) Division of application No. 10/425,830, filed on Apr. 30, 2003, now Pat. No. 6,884,275, which is a continuation of application No. PCT/JP02/07433, filed on Jul. 23, 2002.

(30) Foreign Application Priority Data

Jul. 24, 2001 (JP) ............................. 2001-223344
Jul. 4, 2002 (JP) ............................. 2002-195451

(51) Int. Cl.
C22C 1/04 (2006.01)
C22C 19/05 (2006.01)
(52) U.S. Cl. ........................................ 75/246
(58) Field of Classification Search .................. 75/246
See application file for complete search history.

(56) References Cited

U.S. PATENT DOCUMENTS

| | | | |
|---|---|---|---|
| 3,155,491 A | 11/1964 | Hoppin, III et al. | |
| 4,073,639 A | 2/1978 | Duvall et al. | |
| 4,299,629 A | * 11/1981 | Haack | ........................ 419/32 |
| 4,381,944 A | 5/1983 | Smith et al. | |
| 4,478,638 A | 10/1984 | Smith et al. | |
| 4,910,098 A | 3/1990 | Lee et al. | |
| 5,240,491 A | 8/1993 | Budinger et al. | |
| 5,427,735 A | 6/1995 | Ritter et al. | |
| 5,628,814 A | 5/1997 | Reeves et al. | |

FOREIGN PATENT DOCUMENTS

| | | |
|---|---|---|
| CA | 1214053 | 11/1986 |
| CA | 1313596 | 2/1993 |
| CA | 1324242 | 11/1993 |
| EP | 0 005 668 | 11/1979 |
| EP | 0 095 668 | 12/1983 |
| WO | WO89/03264 | 4/1989 |
| WO | WO89/03740 | 5/1989 |
| WO | WO92/03241 | 3/1992 |

OTHER PUBLICATIONS

Jahnke B. et al., "Microstructural investigations of a Nickel-Based repair coating processed by liquid phase diffusion sintering", Thin Solid Films, 110, Metallurgical and Protective Coatings, XP-002322859, 1983, pp. 225-235.

* cited by examiner

*Primary Examiner*—Ngoclan T. Mai
(74) *Attorney, Agent, or Firm*—Oblon, Spivak, McClelland, Maier & Neustadt, P.C.

(57) ABSTRACT

Disclosed is a Ni-based sintered alloy used for preparing a high temperature part utilized under a high temperature gas atmosphere, characterized in that the Ni-based sintered alloy is prepared by mixing and heating two kinds of Ni alloy powders differing from each other in the melting point.

9 Claims, 2 Drawing Sheets

NI-BASED SINTERED ALLOY

CROSS-REFERENCE TO RELATED APPLICATIONS

The present application is a divisional of application Ser. No. 10/425,830, filed on Apr. 30, 2003, now U.S. Pat. No. 6,884,275, and in which the entire contents are incorporated herein by reference. Application Ser. No. 10/425,830 is a Continuation Application of PCT application Ser. No. PCTJP02/07433, filed Jul. 23, 2002, which was not published under PCT Article 21(2) in English.

This application is based upon and claims the benefit of priority from the prior Japanese Patent Applications No. 2001-223344, filed Jul. 24, 2001; and No. 2002-195451, filed Jul. 4, 2002, the entire contents of both of which are incorporated herein by reference.

BACKGROUND OF THE INVENTION

1. Field of the Invention

The present invention relates to a Ni-based sintered alloy, used for forming high temperature parts in gas turbines, jet engines, etc., particularly, for forming a dynamic vane or a static vane.

2. Description of the Related Art

It is known to the art that a cast alloy or a forged alloy is generally used for forming dynamic and static vanes used under high temperature atmospheres, such as in a gas turbine or jet engine. However, these alloys are insufficient in the workability and the formability. On the other hand, a Ni-based alloy has good formability characteristics, making it possible to manufacture or repair a part-easily. Further, a Ni-based cast alloy, which exhibits the characteristics of a Ni-based alloy, is excellent in mechanical strength under high temperatures and, thus, is widely used for the manufacture of dynamic and static vanes.

It should also be noted that known parts made of a Ni-based cast alloy or a Ni-based forged alloy and used under a high temperature environment are indeed excellent in mechanical strength under high temperatures. However, if exposed to a high temperature atmospheres for a long time, the known part noted above incurs damage during the operation, due to thermal fatigue in the portion that is brought into direct contact with a high temperature gas. If the damage is found in, for example, a periodical inspection, welding or brazing is carried out for locally repairing the damaged portion.

However, if welding is carried out on the damaged portion defects such as welding cracks are generated. Also, if brazing is carried out on the damaged portion, the creep strength and thermal fatigue strength are rendered insufficient. Further, since the brazing material differs from the material of the part to be repaired, the coupling strength is weak at the interface portion between the brazing material and the portion to be repaired. Still further, since the brazing material is low in viscosity, it flows out if the repaired portion is large.

BRIEF SUMMARY OF THE INVENTION

An object of the present invention is to provide a Ni-based sintered alloy, by mixing and heating two kinds of Ni alloy powders of different melting points, so as to render welding unnecessary and, thus, to avoid the generation of welding defects caused by welding, and overcome the deficiency in mechanical strength.

For achieving the object noted above, the invention is directed to a Ni-based sintered alloy used for the manufacture of a high temperature part utilized under a high temperature gas atmosphere, the alloy being manufactured by mixing and heating two kinds of Ni alloy powders differing from each other in the melting point.

In this case, a high melting point Ni alloy powder having a melting point higher than the heating temperature in the sintering treatment and a low melting point Ni alloy powder having a melting point lower than the heating temperature in the sintering treatment are used as the two kinds of the Ni alloy powders, in a preferred embodiment for example, so as to permit the low melting point Ni alloy powder alone to be melted during the heating for the sintering treatment, thereby allowing the molten low melting point Ni alloy powder to fill the clearances among the high melting point Ni alloy powder particles and achieving a mutual diffusion. In other words, the low melting point Ni alloy powder is mixed with the high melting point Ni alloy powder so as to make it possible to obtain a Ni-based sintered alloy having a high mechanical strength.

In this case, the mixing ratio of the low melting point Ni alloy powder is set at 30 to 60% by weight based on the total amount of the Ni alloy powder prepared by mixing the high melting point Ni alloy powder with the low melting point Ni alloy powder. If the mixing ratio of the low melting point Ni alloy powder is lower than 30% by weight, it is impossible to obtain a sufficient sintering function because the amount of the low melting point Ni alloy power, which is melted, is insufficient. On the other hand, if the mixing ratio noted above exceeds 60% by weight, the amount of the low melting point Ni alloy powder, which is melted, is excessively large. In this case, the proportion occupied by the liquid phase portion is increased, resulting in failure to obtain a sufficient mechanical strength.

Also, in another embodiment, it is desirable to set the compositions of the high melting point Ni alloy powder and the low melting point Ni alloy powder such that the composition of the Ni-based sintered alloy formed after the sintering treatment is rendered substantially equal to the composition of the Ni alloy used as the base material of the high temperature part. If the Ni-based sintered alloy formed after the sintering treatment is rendered substantially equal in composition to the base material of the high temperature part, the Ni-based sintered alloy is rendered compatible with the base material of the high temperature part in the interface between the Ni-based sintered alloy and the base material of the high temperature part so as to make it possible to increase the coupling strength between the two.

Also, in other embodiments of the invention, the high melting point Ni alloy powder contains Ni and Cr as constituents of the alloy and also contains at least one of Co, W and Ta as an additional constituent of the alloy, and the low melting point Ni alloy powder contains Ni, Cr, Co, Ta, Ti, Al and B as constituents of the alloy.

Further, in other embodiments of the invention, where IN738LC constitutes the Ni-based alloy used as the base material of the high temperature part, the high melting point Ni alloy powder has a composition of Ni-16 to 18 Cr-0 to 5 Co-0.0 to 3.5 W-0.0 to 1.0 Ta-0.0 to 1.0 Ti-0.0 to 1.0 Al-0.15 to 0.3 C-0.01 to 0.03 B-0.0 to 0.1Zr, and the low melting point Ni alloy powder has a composition of Ni-8 to 12 Cr-16 to 20 Co-2.0 to 3.5 Mo-1.5 to 2.5 W-5 to 9 Ta-7.5 to 10 Ti-8.5 to 10.5 Al-1 to 3 Nb-0.5 to 3.5 B-0.00 to 0.35Zr Also, in other embodiments of the invention, where MGA1400 constitutes the Ni-based alloy used as the base material of the high temperature part, the high melting point Ni alloy powder has a composition of Ni-10 to 20 Cr-0 to 7 Co-0 to 2 Mo-0 to 9 W-0.0 to 0.3 C-0.00 to 0.03B and the low melting point Ni alloy powder has a composition of Ni-3 to 13 Cr-14 to 24 Co-1.5 to 7.5 Mo-0.5 to 11 W-5 to 9 Ta-4 to 9 Ti-7.5 to 11.5 Al-0.00 to 0.02 C-0.5 to 3.5B.

In the Ni-based sintered alloy in preferred embodiments, the high melting point Ni alloy powder has a melting point not lower than 1,300° C. and the low melting point Ni alloy powder has a melting point not higher than 1,200° C. in the case where IN738LC constitutes the Ni-based alloy used as the base material of the high temperature part. Also, in other preferred embodiments, the high melting point Ni alloy powder has a melting point not lower than 1,300° C. and the low melting point Ni alloy powder has a melting point not higher than 1,250° C. in the case where MGA1400 constitutes the Ni-based alloy used as the base material of the high temperature part.

For forming each of the Ni-based sintered alloys described in the above embodiments, a mixture of the high melting point Ni alloy powder and the low melting point Ni alloy powder is heated under temperatures of 1,150 to 1,250° C. for 2 to 12 hours. The sintering temperature and the sintering time noted above can also be applied to the manufacture of the Ni-based sintered alloy.

The present invention will now be described more in detail.

BRIEF DESCRIPTION OF THE PRESENT INVENTION

In the present invention, two kinds of Ni alloy powders differing from each other in the melting point, e.g., a Ni alloy powder having a high melting point (hereinafter referred to as a "high melting point Ni alloy powder) and a Ni alloy powder having a low melting point (hereinafter referred to as a "low melting point Ni alloy powder), are mixed and heated so as to permit the low melting point Ni alloy powder alone, or the low melting point Ni alloy powder and a part of the high melting point Ni alloy powder, to be melted and involved in the reaction, thereby achieving a liquid phase sintering. FIGS. 1A and 1B show how the high melting point Ni alloy powder (H) and the low melting point Ni alloy powder (L) are mixed and heated. Before the heating, the Ni alloy powder particles (H) and (L) are mixed so as to permit the low melting point Ni alloy powder particles (L) to be positioned in the clearances formed among the high melting point Ni alloy powder particles (H), as shown in FIG. 1A.

Then, the mixture of the high melting point Ni alloy powder (H) and the low melting point Ni alloy powder (L) is heated under temperatures higher than the melting point of the low melting point Ni alloy powder (L) and lower than the melting point of the high melting point Ni alloy powder (H) so as to melt the low melting point Ni alloy powder (L). As a result, the molten low melting point Ni alloy powder (L) fills most of the clearances between the high melting point Ni alloy power particles (H) by the capillary phenomenon so as to form a molten Ni alloy portion 1, as shown in FIG. 1B. It follows that it is possible to obtain an alloy having a high mechanical strength by this liquid phase sintering.

Where a Ni alloy powder, hereinafter referred to as a Ni-based sintered alloy powder, prepared by mixing a low melting point Ni alloy powder and a high melting point Ni alloy powder is used for the sintering, the mixing ratio of the low melting point Ni alloy powder should be set to fall within a range of between 30 and 60% by weight based on the total amount of the Ni-based sintered alloy powder. If the mixing ratio of the low melting point Ni alloy powder is lower than 30% by weight, the low melting point Ni alloy powder fails to be diffused sufficiently, with the result that the sintering does not proceed sufficiently. On the other hand, if the mixing ratio of the low melting point Ni alloy powder exceeds 60% by weight, the portion occupied by the molten Ni alloy portion 1 relative to the clearances formed between the high melting point Ni alloy powder particles is rendered large, which increases the liquid phase portion. It follows that a sufficiently high mechanical strength cannot be obtained.

A Ni alloy containing at least Ni and Cr, and an additional element selected from the group consisting of Co, W and Ta, is used as the high melting point alloy powder contained in the Ni-based sintered alloy powder. Also, a Ni alloy containing at least Ni, Cr, Co, W, Tl, Al and B is used as the low melting point Ni alloy powder.

The composition of the alloy components of each of the Ni alloy powders contained in the Ni-based sintered alloy powder is controlled according to the melting points of the alloy components. Also, the composition noted above is controlled such that each alloy component added produces its effect after the Ni-based sintered alloy powder obtained by the mixing at a prescribed mixing ratio is subjected to the reaction, and that a harmful brittle phase such as a σ-phase is not generated. Further, the composition of the alloy powder of each of the Ni alloy powders contained in the Ni-based sintered alloy powder is set such that the composition ratio of each alloy after the sintering of the Ni-based sintered alloy powder is rendered close to the composition ratio of each alloy contained in the Ni-based alloy used as the base material.

In heating the Ni-based sintered alloy powder described above for the sintering purpose, the heating temperature should be within a range of between 1,150° C. and 1,250° C., and the heating time should be within a range of between 2 and 12 hours. If the heating temperature is lower than 1,150° C., the low melting point Ni alloy powder fails to be melted sufficiently, with the result that a liquid phase is not generated by the capillary phenomenon. On the other hand, if the heating temperature exceeds 1,250° C., the base material tends to be melted. Incidentally, it is desirable to carry out a stepwise heating treatment after the heat treatment for the sintering purpose. To be more specific, a solution treatment after the sintering treatment is carried out at 1,120° C.±10° C. for 2 to 4 hours, followed by further applying an aging treatment after the sintering treatment at 850° C.±10° C. for 16 to 24 hours.

In the stepwise heat treatment described above, the solution treatment after the sintering treatment is intended to permit the γ'-phase ($Ni_3Al$ intermetallic compound) in the base material, which is precipitated in the cooling process included in the heat treatment for the sintering noted above, to form a solid solution. In this case, the solution treatment should be carried out under the temperature of 1,120° C. in order to prevent the γ'-phase from forming a solid solution and from being subjected to the initial melting. Also, the solution treatment should be carried out for 2 to 4 hours in order to permit each of the alloy components to be diffused sufficiently. On the other hand, the aging treatment after the sintering treatment is intended to permit the γ'-phase to be precipitated uniformly. In this case, the aging treatment after the sintering treatment should be carried out under the temperature of 850° C. in order to permit the γ'-phase to be precipitated uniformly and to be made fine. Also, the aging treatment should be carried out for 16 to 24 hours in order to achieve the precipitation adapted for the alloy composition.

After the heat treatment for the sintering purpose or after the heat treatment after the sintering treatment, it is desirable for the area ratio of the pores in the Ni-based sintered alloy formed from the Ni-based sintered alloy powder to fall within a range of between 0 and 5% based on the entire Ni-based sintered alloy. It is unavoidable for the pores to be generated during the sintering treatment. However, where the area ratio of the pores exceeds 5%, the mechanical strength and the ductility of the Ni-based sintered alloy is adversely affected.

The Ni-based sintered alloy formed from the Ni-based sintered alloy powder as described above can be utilized for, for example, bulk molding, coating, and local padding. The bulk molding noted above denotes that, after the Ni-based sintered alloy powder is molded in the shape of a vane by the pressure application, the molded alloy powder is sintered. The coating denotes that, after a thinned portion caused by, for example, a high temperature oxidation, is coated with a Ni-based sintered alloy powder by means of, for example, a low pressure plasma flame spraying method or a high speed flame spraying method, the coating is heated for the sintering purpose. Further, the local padding noted above denotes that, after a Ni-based sintered alloy powder is padded on the portion to be repaired, such as a cracked portion, the padded portion is sintered.

According to the present invention, the Ni-based sintered alloy is prepared by mixing and heating two kinds of Ni alloy powders differing from each other in the melting point so as to make it unnecessary to employ the welding treatment. It follows that the present invention makes it possible to provide a Ni-based sintered alloy that permits avoiding the occurrence of welding defects caused by the welding treatment and also permits overcoming the insufficient mechanical strength. Also, it is possible to render the composition of the formed Ni-based sintered alloy substantially equal to the composition of the base material of the high temperature part. It follows that the base material is rendered compatible with the Ni-based sintered alloy at the interface between the two so as to make it possible to overcome the insufficient coupling strength after the repair.

DETAILED DESCRIPTION OF THE INVENTION

First Embodiment

Figures 1A, 1B:
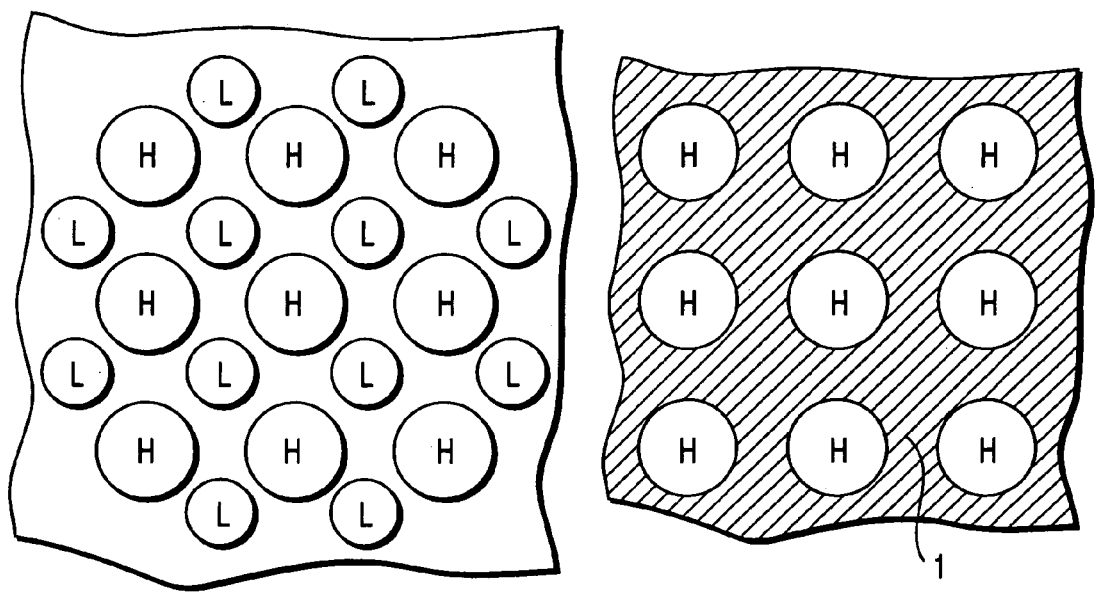
FIGS. 1A and 1B collectively show how a Ni alloy powder having a high melting point and another Ni alloy powder having a low melting point, which are used for preparing the Ni-based sintered alloy of the present invention, are mixed and changed after the heat treatment.

A first embodiment of the present invention will now be described. In this embodiment, IN738LC is used as the base material. The material IN738LC noted above has a composition of Ni-15.7 to 16.3 Cr-8 to 9 Co-1.5 to 2.0 Mo-2.4 to 2.8 W-1.5 to 2.0 Ta-3.2 to 3.7 Ti-3.2 to 3.7 Al-1.5 to 2.0 Nb-0.09 to 0.13 C-0.007 to 0.012 B-0.03 to 0.08 Zr.

The Ni-based sintered alloy powder in the first embodiment of the present invention contains a high melting point Ni alloy powder having a melting point not lower than 1,300° C. The high melting point Ni alloy powder noted above has a composition of, for example, Ni-16 to 18 Cr-0 to 5 Co-0.0 to 3.5 W-0.0 to 1.0 Ta-0.0 to 1.0 Ti-0.0 to 1.0 Al-0.15 to 0.3 C-0.01 to 0.03 B-0.0 to 0.1 Zr. In this case, each of the alloy components added to Ni produces the effects described below.

First of all, Cr is an alloy component serving to impart an oxidation resistance and a corrosion resistance to the alloy. Cobalt (Co) permits increasing the upper limits of the ranges in the amounts of Al and Ti, which are alloy components effective for improving the high temperature mechanical strength by forming a γ'-phase ($Ni_3Al$ intermetallic compound), within which a solid solution is formed under high temperatures. As a result, Co contributes to the improvement in the high temperature mechanical strength. Tungsten (W) is effective for strengthening the solid solution so as to contribute to the improvement in the high temperature mechanical strength. Further, Ta contributes to the strengthening of the solid solution and to the improvement in the high temperature mechanical strength by the strengthening of the precipitation achieved by the γ'-phase.

Each of Ti and Al contributes to the improvement in the high temperature mechanical strength by the strengthening of the precipitation achieved by the γ'-phase. Carbon (C) forms a carbide and, thus, to strengthen mainly the crystal boundary so as to contribute to the improvement in the high temperature mechanical strength. Further, each of B and Zr serves to increase the coupling force at the grain boundary so as to improve the high temperature mechanical strength.

On the other hand, the Ni-based sintered alloy powder according to the first embodiment of the present invention contains a low melting point Ni alloy powder having a melting point falling within a range of between 1,120° C. and 1,200° C. The low melting point Ni alloy powder noted above has a composition of, for example, Ni-8 to 12 Cr-16 to 20 Co-2.0 to 3.5 Mo-1.5 to 2.5 W-5 to 9 Ta-7.5 to 10 Ti-8.5 to 10.5 Al-1 to 3 Nb-0.5 to 3.5 B-0.00 to 0.35 Zr.

The effect produced by the addition of each of the alloy components is equal to that in the case of the high melting point Ni alloy powder. Also, Mo, which is not contained in the high melting point Ni alloy powder, produces the effect of strengthening the solid solution and contributes to the improvement in the high temperature mechanical strength like W. Further, Nb forms the γ'-phase together with Al like Ti so as to contribute to the improvement in the high temperature mechanical strength. Still further, the low melting point Ni alloy powder contains additional elements Co, Mo, Ta, Ti, Al and B in amounts larger than those in the high melting point Ni alloy powder. The additional elements noted above are intended to lower the melting point of the low melting point Ni alloy powder. Particularly, B produces a prominent effect of lowering the melting point of the low melting point Ni alloy powder. However, B renders the alloy brittle when the alloy is sintered. Therefore, it is necessary to suppress the addition amount of B.

When the bulk molding, the coating or the local padding referred to previously is performed by using a Ni-based sintered alloy powder prepared by mixing a high melting point Ni alloy powder of the composition described above and a low melting point Ni alloy powder of the composition described above in a manner to permit the mixing ratio of the low melting point Ni alloy powder to fall within a range of between 30 and 60% by weight, the Ni-based sintered alloy powder is sintered by the heating at 1,150° C. to 1,250° C. for 2 to 12 hours. When the base material and the Ni-based sintered alloy are cooled after completion of the heat treatment for the sintering purpose, it is possible to apply a stepwise heat treatment such that the heat treatment is applied at 1,120° C.±10° C. for 2 to 4 hours, followed by applying an additional heat treatment at 850° C.±10° C. for 16 to 24 hours.

A sintering treatment using a Ni-based sintered alloy powder according to the first embodiment of the present invention will now be described. Incidentally, the numerals etc. of each part referred to in the Examples described in the following are no more than examples and do not specify the claimed scope of the present invention.

EXAMPLE 1

Figure 2:
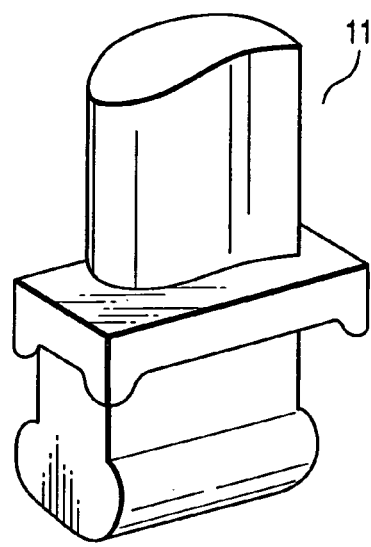
FIG. 2 is an oblique view showing a turbine made of a Ni-based sintered alloy in Example 1 according to the first embodiment of the present invention.

In this Example, the bulk molding will be described with reference to FIG. 2. First of all, the two kinds of Ni alloy powders forming the Ni-based sintered alloy powder are formed of the powders having the compositions given below:

Low melting point Ni alloy powder: Ni-10.7 Cr-17.2 Co-2.6 Mo-2.0 W-5.8 Ta-8.6 Ti-8.7 Al-2.6 Nb-1.2 B-0.27 Zr High melting point Ni alloy powder: Ni-17.1 Cr-3.1 W-0.19 C.

A Ni-based sintered alloy powder was prepared by mixing in, for example, a ball mill, 45% by weight of the low melting point Ni alloy powder of the composition given above and 55% by weight of the high melting point Ni alloy powder of the composition given above. After the Ni-based sintered alloy powder was subjected to a compression molding in the shape of a vane, the molded powder was sintered by the heating at 1,215° C. for 8 hours. Then, a stepwise heat treatment including the heating at 1,120° C. for 2 hours and the additional heating at 850° C. for 24 hours, which correspond to the solution treatment and the aging treatment, respectively, was applied to the sintered molding for increasing the mechanical strength of the molding, thereby preparing a dynamic vane 11 of a turbine as shown in FIG. 2.

According to Example 1, the dynamic vane 11 was prepared by mixing and heating two kinds of Ni-based alloys. Therefore, the capillary phenomenon described previously was brought about between the low melting point Ni alloy powder and the high melting point Ni alloy powder, as shown in FIGS. 1A and 1B, so as to make it possible to obtain the dynamic vane 11 having a sufficiently high mechanical strength. Also, a stepwise heat treatment consisting of the solution treatment and the aging treatment was applied after the heating for the sintering purpose so as to permit the γ'-phase to be precipitated uniformly within the base material, thereby further increasing the mechanical strength of the dynamic vane 11.

Incidentally, in Example 1, it is possible to further apply a high temperature hydrostatic pressure (HIP) treatment in carrying out the sintering treatment. In this case, the HIP treatment is carried out at 1,200° C. for 4 hours under the pressure of 1,500 kg/cm². By employing the HIP treatment together with the sintering treatment, it is possible to suppress or eliminate the pores formed after the sintering treatment.

EXAMPLE 2

Figure 3A:
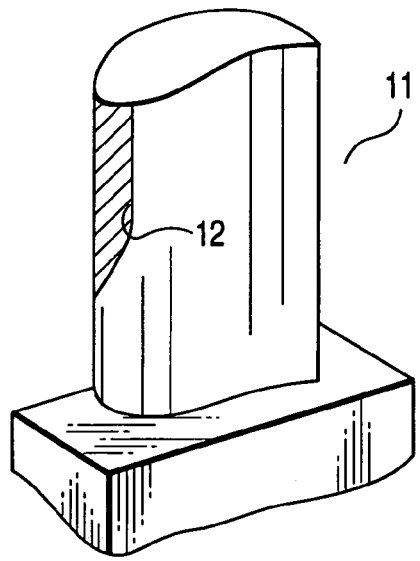
FIGS. 3A and 3B are oblique views collectively showing a turbine made of a Ni-based sintered alloy in Example 2 according to the first embodiment of the present invention.
Figure 3B:
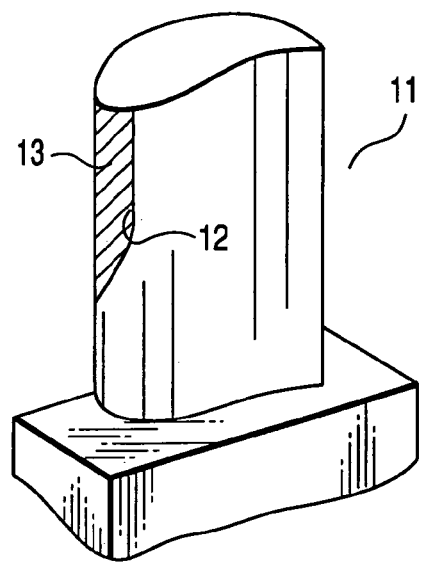

In this Example, the coating will be described with reference to FIGS. 3A and 3B. FIG. 3A schematically shows the construction of a dynamic vane before the coating, and FIG. 3B schematically shows the dynamic vane after the coating. The Ni-based sintered alloy powder used in Example 2, which included a low melting point Ni alloy powder and a high melting point Ni alloy powder, was equal in composition to the Ni-based sintered alloy powder used in Example 1.

To be more specific, a Ni-based sintered alloy powder was prepared by mixing, in a ball mill, 45% by weight of a low melting point Ni alloy powder having a particle diameter not larger than 75 μm and 55% by weight of a high melting point Ni alloy powder having a particle diameter not larger than 150 μm. Then, the Ni-based sintered alloy powder was blown onto a thin portion 12 of the dynamic vane 11 shown in FIG. 3A by, for example, a low pressure plasma spraying method so as to achieve the coating, followed by heating the coating at 1215° C. for 8 hours so as to sinter the coating. After the sintering treatment, a heat treatment at 1,120° C. for 2 hours and an additional heat treatment at 850° C. for 24 hours, which correspond to the solution treatment and the aging treatment, respectively, were applied as in Example 1 so as to form a coating portion 13 strongly bonded to the thin portion 12, as shown in FIG. 3B. In this fashion, the dynamic vane 11 including the coating portion 13 was formed so as to repair the dynamic vane 11.

Incidentally, in Example 2, it is possible to apply an HIP treatment in carrying out the sintering treatment at, for example, 1,200° C. for 4 hours under a pressure of 1,500 kg/cm², as in Example 1, so as to suppress or eliminate the pores formed after the sintering treatment.

EXAMPLE 3

Figure 4A:
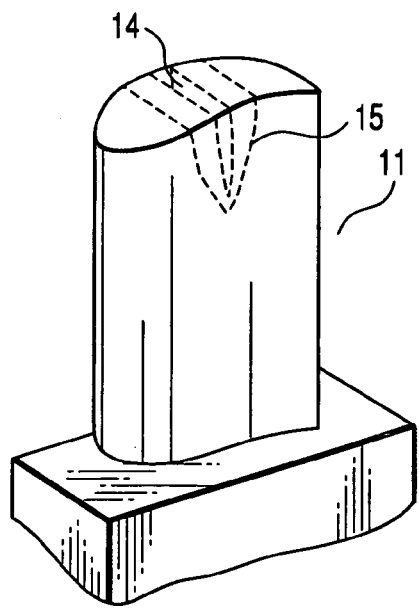
FIGS. 4A and 4B are oblique views collectively showing a turbine made of a Ni-based sintered alloy in Example 3 according to the first embodiment of the present invention.
Figure 4B:
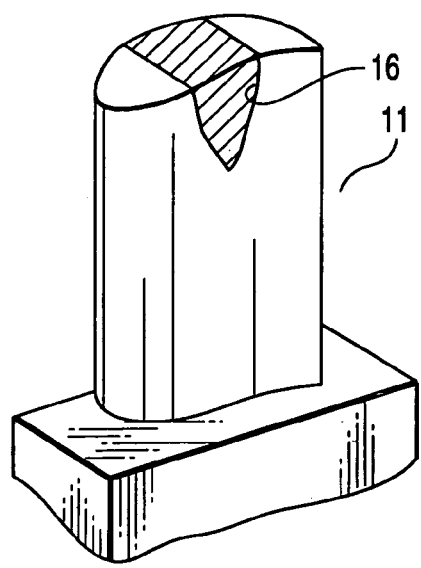

In this Example, a local padding will be described with reference to FIGS. 4A and 4B. FIG. 4A schematically shows the dynamic vane before the local padding treatment, and FIG. 4B schematically shows the dynamic vane after the local padding treatment. Also, the Ni-based sintered alloy powder used in Example 3, which included a low melting point Ni alloy powder and a high melting point Ni alloy powder, was equal in composition to the Ni-based sintered alloy powder used in Example 1.

Example 3 covers the case of repairing, for example, a cracked portion 14 of the dynamic vane 11. In the case of Example 3, a peripheral portion 15 of the cracked portion 14 denoted by dotted lines in FIG. 4A is removed first by the cutting with, for example, a grinder. Then, a Ni-based sintered alloy powder is prepared by mixing, in a ball mill, 45% by weight of a low melting point Ni alloy powder and 55% by weight of a high melting point Ni alloy powder, followed by kneading the resultant Ni-based sintered alloy powder by using an organic solvent (e.g., Microbrace #510, which is the trade name of an organic solvent manufactured by Wall Coromoite Inc.), so as to obtain a clay-like mass.

In the next step, the clay-like mixture containing the Ni-based sintered alloy powder is padded so as to form a mass resembling the peripheral portion 15 of the cracked portion removed previously, followed by applying a sintering treatment and the subsequent heat treatment under the conditions equal to those for Example 1, thereby forming a padded portion 16 corresponding to the peripheral portion 15 of the cracked portion as shown in FIG. 4B. In this fashion, the dynamic vane 11 having the cracked portion 14 is molded so as to repair the dynamic vane 11.

Incidentally, in Example 3, it is possible to apply an HIP treatment in carrying out the sintering treatment at, for example, 1,200° C. for 4 hours under a pressure of 1,500 kg/cm$^2$, as in Example 1, so as to suppress or eliminate the pores formed after the sintering treatment.

SECOND EMBODIMENT

A second embodiment of the present invention will now be described. In the second embodiment of the present invention, MGA1400 is used as the base material. The material MGA1400 has a composition of Ni-13.1 to 15.0 Cr-8.5 to 10.5 Co-1.0 to 3.5 Mo-3.5 to 4.5 W-3.0 to 5.5 Ta-2.2 to 3.2 Ti-3.5 to 4.5 Al-0.06 to 0.12 C-0.005 to 0.025 B-0.01 to 0.05 Zr.

The high melting point Ni alloy powder contained in the Ni-based sintered alloy powder according to the second embodiment of the present invention has a melting point not lower than 1,300° C. The high melting point Ni powder alloy has a composition of, for example, Ni-10 to 20 Cr-0 to 7 Co-0 to 2 Mo-0 to 9 W-0 to 3 Ta-0.0 to 0.3 C-0.00 to 0.03 B. Incidentally, the effect produced by each of the alloy components added to Ni is equal to that described previously in conjunction with the first embodiment of the present invention.

On the other hand, the low melting point Ni alloy powder contained in the Ni-based sintered alloy powder according to the second embodiment of the present invention has a melting point not higher than 1,250° C., particularly, not higher than 1,215° C. The low melting point Ni alloy powder has a composition of, for example, Ni-3 to 13 Cr-14 to 24 Co-1.5 to 7.5 Mo-0.5 to 11 W-5 to 9 Ta-4 to 9 Ti-7.5 to 11 Al-0.00 to 0.02 C-0.5 to 3.5 B. Incidentally, the effect produced by each of the alloy components added to Ni is equal to that described previously in conjunction with the first embodiment of the present invention.

When the bulk molding, the coating or the local padding referred to previously is performed by using a Ni-based sintered alloy powder prepared by mixing a high melting point Ni alloy powder of the composition described above and a low melting point Ni alloy powder of the composition described above in a manner to permit the mixing ratio of the low melting point Ni alloy powder to fall within a range of between 30 and 60% by weight, the Ni-based sintered alloy powder is sintered by the heating at 1,150° C. to 1,250° C. for 2 to 12 hours. When the base material and the Ni-based sintered alloy are cooled after completion of the heat treatment for the sintering purpose, it is possible to apply a stepwise heat treatment such that the heat treatment is applied at 1,120° C.±10° C. for 2 to 4 hours, followed by applying an additional heat treatment at 850° C.±10° C. for 16 to 24 hours.

Tables 1 and 2 show the composition (% by weight) of the Ni-based sintered alloy, which is formed when the base material MGA1400 is sintered by using a Ni-based sintered alloy powder. Table 1 covers the case where the low melting point Ni alloy powder has a composition of Ni-4.81 Cr-22.05 Co-5.29 Mo-8.94 W-7.93 Ta-6.94 Ti-9.47 Al-0.02 C-1.53 B. Also, the high melting point Ni alloy powder has a composition of Ni-18.35 Cr-1.62 Ta-0.10 C-0.017 B. A Ni-based sintered alloy powder consisting of the low melting point Ni alloy powder of the composition given above and the high melting point Ni alloy powder having the composition given above is subjected to a sintering treatment by the heating at 1,215° C. for 8 hours.

Where the mixing ratio of the low melting point Ni alloy powder is set at 55% by weight, 50% by weight and 45% by weight, the formed Ni-based sintered alloys have compositions 1), 2) and 3) given below, respectively:

1) Ni-10.90 Cr-12.13 Co-2.91 Mo-4.92 W-5.09 Ta-3.82 Ti-5.21 Al-0.06 C-0.85 B
2) Ni-11.58 Cr-11.03 Co-2.65 Mo-4.47 W-4.78 Ta-3.47 Ti-4.74 Al-0.06 C-0.77 B
3) Ni-12.26 Cr-9.92 Co-2.38 Mo-4.02 W-4.46 Ta-3.12 Ti-4.26 Al-0.07 C-0.70 B

Table 2 covers the case where the low melting point Ni alloy powder has a composition of Ni-11.71 Cr-15.09 Co-2.28 Mo-1.90 W-7.98 Ta-5.72 Ti-7.89 Al-0.009 C-1.96B. Also, the high melting point Ni alloy powder has a composition of Ni-13.21 Cr-5.01 Co-0.99 Mo-7.50 W-0.13C. A Ni-based sintered alloy powder consisting of the low melting point Ni alloy powder of the composition given above and the high melting point Ni alloy powder having the composition given above is subjected to a sintering treatment by the heating at 1,215° C. for 8 hours.

Where the mixing ratio of the low melting point Ni alloy powder is set at 55% by weight, 50% by weight and 45% by weight, the formed Ni-based sintered alloys have compositions 4), 5) and 6) given below, respectively:

4) Ni-12.39 Cr-10.55 Co-1.70 Mo-4.42 W-4.39 Ta-3.15 Ti-4.34 Al-0.065 C-1.08 B
5) Ni-12.46 Cr-10.05 Co-1.64 Mo-4.7 W-3.99 Ta-2.86 Ti-3.95 Al-0.072 C-0.98 B
6) Ni-12.54 Cr-9.55 Co-1.57 Mo-4.98 W-3.59 Ta-2.57 Ti-3.55 Al-0.078 C-0.88 B

TABLE 1

|  |  | Ni | Cr | Co | Mo | W | Ta | Ti | Al | C | B | Zr |
|---|---|---|---|---|---|---|---|---|---|---|---|---|
| Low melting point Ni alloy powder | | 32.90 | 4.81 | 22.05 | 5.29 | 8.94 | 7.93 | 6.94 | 9.47 | 0.02 | 1.53 | 0.00 |
| High melting point Ni alloy powder | | 79.90 | 18.35 | 0.00 | 0.00 | 0.00 | 1.62 | 0.00 | 0.00 | 0.10 | 0.017 | 0.00 |
| Mixing composition | 55% mixing | 54.05 | 10.90 | 12.13 | 2.91 | 4.92 | 5.09 | 3.82 | 5.21 | 0.06 | 0.85 | 0.00 |
|  | 50% mixing | 56.40 | 11.58 | 11.03 | 2.65 | 4.47 | 4.78 | 3.47 | 4.74 | 0.06 | 0.77 | 0.00 |
|  | 45% mixing | 58.75 | 12.26 | 9.92 | 2.38 | 4.02 | 4.46 | 3.12 | 4.26 | 0.07 | 0.70 | 0.00 |
| MGAI400 | | Bal. | 13.1 to 15.0 | 8.5 to 10.5 | 1.0 to 3.5 | 3.5 to 4.5 | 3.0 to 5.5 | 2.2 to 3.2 | 3.5 to 4.5 | 0.06 to 0.12 | 0.005 to 0.025 | 0.01 to 0.05 |

TABLE 2

|  |  | Ni | Cr | Co | Mo | W | Ta | Ti | Al | C | B | Zr |
|---|---|---|---|---|---|---|---|---|---|---|---|---|
| Low melting point Ni alloy powder | | 45.40 | 11.71 | 15.09 | 2.28 | 1.90 | 7.98 | 5.72 | 7.89 | 0.009 | 1.96 | 0.00 |
| High melting point Ni alloy powder | | 73.10 | 13.21 | 5.01 | 0.99 | 7.50 | 0.00 | 0.00 | 0.00 | 0.134 | 0 | 0.00 |
| Mixing composition | 55% mixing | 57.87 | 12.39 | 10.55 | 1.70 | 4.42 | 4.39 | 3.15 | 4.34 | 0.07 | 1.08 | 0.00 |
|  | 50% mixing | 59.25 | 12.46 | 10.05 | 1.64 | 4.70 | 3.99 | 2.86 | 3.95 | 0.07 | 0.98 | 0.00 |
|  | 45% mixing | 60.64 | 12.54 | 9.55 | 1.57 | 4.98 | 3.59 | 2.57 | 3.55 | 0.08 | 0.88 | 0.00 |
| MGAI400 | | Bal. | 13.1 to 15.0 | 8.5 to 10.5 | 1.0 to 3.5 | 3.5 to 4.5 | 3.0 to 5.5 | 2.2 to 3.2 | 3.5 to 4.5 | 0.06 to 0.12 | 0.005 to 0.025 | 0.01 to 0.05 |

As described above, in the case of using a Ni-based sintered alloy powder prepared by mixing a low melting point Ni alloy powder and a high melting point Ni alloy powder each having the composition as shown in Tables 1 and 2, it is possible to obtain a Ni-based sintered alloy having a composition close to that of the base material MGAI400 by sintering the Ni-based sintered alloy powder noted above by the same method as that employed in each of Examples 1 to 3 according to the first embodiment of the present invention. Particularly, it is possible to allow the composition ratio of each of the coating portion 13 shown in FIGS. 3A and 3B and the padded portion 16 shown in FIGS. 4A and 4B by, which are formed by the coating method in Example 2 and by the local padding method in Example 3, respectively, according to the first embodiment of the present invention, to be close to the composition ratio of the base material of the dynamic vane 11 so as to increase the coupling strength of each of the coating portion 13 and the padded portion 16 referred to above.

What is claimed is:

1. A Ni-based sintered alloy used for preparing a high temperature part, prepared by mixing and heating two kinds of Ni alloy powders differing from each other in the melting point;
wherein the Ni-based sintered alloy is the two kinds of Ni alloy powders consist of a high melting point Ni alloy powder, having a melting point higher than the heating temperature in carrying out a sintering treatment, and a low melting point Ni alloy powder, having a melting point lower than the heating temperature in carrying out the sintering treatment, and
wherein MGA1400 constitutes the Ni-based alloy used as the base material of the high temperature part, the high melting point Ni alloy powder has a composition in weight percentage of Ni-10 to 20 Cr-0 to 7 Co-0 to 2 Mo-0 to 9 W-0 to 3 Ta-0.0 to 0.3 C-0.00 to 0.03B, and the low melting point Ni alloy powder has a composition in weight percentage of Ni-3 to 13 Cr-14 to 24 Co-1.5 to 7.5 Mo-0.5 to 11 W-5 to 9 Ta-4 to 9 Ti-7.5 to 11.5 Al-0.00 to 0.02 C-0.5 to 3.5B.

2. The Ni-based sintered alloy according to claim 1, wherein the mixing ratio of the Ni alloy powder having the low melting point, falls within a range of between 30 and 60%, by weight, based on the total amount of the Ni alloy powder prepared by mixing the Ni alloy powder, having the high melting point, and the Ni alloy powder, having the low melting point.

3. The Ni-based sintered alloy according to claim 2, wherein the composition of each of the high melting point Ni alloy powder and the low melting point Ni alloy powder is set, such that the composition of the Ni-based sintered alloy, formed after the sintering treatment, is rendered substantially equal to that of the Ni alloy used as the base material of the high temperature part.

4. The Ni-based sintered alloy according to claim 1, wherein the high melting point Ni alloy powder contains at least Ni and Cr as constituents of the alloy, and also contains at least one additional element selected from the group consisting of Co, W and Ta, and the low melting point Ni alloy powder contains at least Ni, Cr, Co, Ta, Ti, Al and B as constituents of the alloy.

5. The Ni-based sintered alloy according to claim 1, wherein, the MGA1400 constitutes the Ni-based alloy used as the base material of the high temperature part, the high melting point Ni alloy powder has a melting point not lower than 1,300° C., and the low melting point Ni alloy powder has a melting point not higher than 1,250° C.

6. The Ni-based sintered alloy according to claim 2, wherein, the MGA1400 constitutes the Ni-based alloy used as the base material of the high temperature part, the high melting point Ni alloy powder has a melting point not lower than 1,300° C., and the low melting point Ni alloy powder has a melting point not higher than 1,250° C.

7. The Ni-based sintered alloy according to claim 3, wherein, the MGA1400 constitutes the Ni-based alloy used as the base material of the high temperature part, the high melting point Ni alloy powder has a melting point not lower than 1,300° C., and the low melting point Ni alloy powder has a melting point not higher than 1,250° C.

8. The Ni-based sintered alloy according to claim 4, wherein, the MGA1400 constitutes the Ni-based alloy used as the base material of the high temperature part, the high melting point Ni alloy powder has a melting point not lower than 1,300° C., and the low melting point Ni alloy powder has a melting point not higher than 1,250° C.

9. The Ni-based sintered alloy according to claim 1, wherein each of the high melting point Ni alloy powder and the low melting point Ni alloy powder is prepared by heating at 1,150° C. to 1,250° C. for 2 to 12 hours, for the sintering purpose.

* * * * *